(12) United States Patent
Wachter et al.

(10) Patent No.: US 12,278,549 B2
(45) Date of Patent: Apr. 15, 2025

(54) ELECTRIC MACHINE

(71) Applicant: Dr. Ing. h.c. F. Porsche Aktiengesellschaft, Stuttgart (DE)

(72) Inventors: Sebastian Wachter, Pressig (DE); Maximilian Barkow, Stuttgart (DE); Patrick Fuchs, Leonberg (DE); Timijan Velic, Weissach (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 352 days.

(21) Appl. No.: 17/868,795

(22) Filed: Jul. 20, 2022

(65) Prior Publication Data

US 2023/0031138 A1 Feb. 2, 2023

(30) Foreign Application Priority Data

Jul. 27, 2021 (DE) ...................... 10 2021 119 486.5

(51) Int. Cl.
*H02K 9/19* (2006.01)
*H02K 3/50* (2006.01)
*H02K 5/20* (2006.01)
*H02K 9/193* (2006.01)
*H02K 11/33* (2016.01)

(52) U.S. Cl.
CPC ............... *H02K 9/193* (2013.01); *H02K 3/50* (2013.01); *H02K 5/203* (2021.01); *H02K 11/33* (2016.01); *H02K 2203/09* (2013.01)

(58) Field of Classification Search
CPC .. H02K 3/24; H02K 5/12; H02K 5/20; H02K 5/203; H02K 9/193; H02K 9/197; H02K 9/20; H02K 9/19; H02K 9/1614; H02K 9/12; H02K 9/08; H02K 9/04; H02K 3/50; H02K 11/33; H02K 2203/09; H02K 5/225
See application file for complete search history.

(56) References Cited

U.S. PATENT DOCUMENTS 10,523,094 B2 * 12/2019 Wang et al. ............ H02K 11/33
2023/0058881 A1 * 2/2023 Asakura et al. ......... H02K 9/19

* cited by examiner

*Primary Examiner* — Thomas Truong
(74) *Attorney, Agent, or Firm* — LEYDIG, VOIT & MAYER, LTD.

(57) ABSTRACT

An electric machine including a pulse inverter having a region with an oil space and busbars, wherein the electric machine is electrically connected to the pulse inverter by the busbars such that the busbars are electrically connected to a connection of the pulse inverter, wherein the busbars and the electric machine are cooled by oil, and wherein the oil for supplying and cooling the busbars is stored within the oil space in the region of the pulse inverter.

9 Claims, 1 Drawing Sheet

ELECTRIC MACHINE

CROSS REFERENCE TO RELATED APPLICATIONS

This application claims benefit to German Patent Application No. DE 10 2021 119 486.5, filed on Jul. 27, 2021, which is hereby incorporated by reference herein.

FIELD

The invention relates to an electric machine comprising a pulse inverter.

BACKGROUND

In the prior art, it is known to electrically contact-connect an electric machine to a pulse inverter by means of busbars. It is known here that the pulse inverter is operated in a manner cooled by water and the electric machine is cooled by oil by way of the busbars. In this arrangement, it is particularly critical that the busbars at the connection at the pulse inverter can be cooled well and a secure seal is still provided in order that there is no leakage in the region of the electrical connection between the oil-cooled regime of the electric machine and the water-cooled regime of the pulse inverter, which could damage or even destroy both the pulse inverter and the electric machine. Therefore, great value is placed on a secure seal against leakages so that the connection region of the busbars in the pulse inverter is surrounded by a dry space. This also results in the electrical contacts of the busbars being of very complex design, which also complicates the design of the seals.

SUMMARY

In an embodiment, the present disclosure provides an electric machine comprising a pulse inverter having a region with an oil space and busbars, wherein the electric machine is electrically connected to the pulse inverter by the busbars such that the busbars are electrically connected to a connection of the pulse inverter, wherein the busbars and the electric machine are cooled by oil, and wherein the oil for supplying and cooling the busbars is stored within the oil space in the region of the pulse inverter.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present invention provides a solution for an electric machine comprising a pulse inverter which permits a simpler design and still reliably and permanently solves the problem of the seal between the various media involved.

An exemplary embodiment of the invention relates to an electric machine comprising a pulse inverter, wherein the electric machine is electrically connected to the pulse inverter by means of busbars in such a way that the busbars electrically connected to the electric machine are electrically connected to a connection of the pulse inverter, wherein the busbars and the electric machine are operated in a manner cooled by oil, wherein the pulse inverter has an oil space in which oil for supplying and cooling the busbars is stored so that the busbars can be supplied with oil within the oil space in the region of the pulse inverter. As a result, the sealed interface between the water-cooled region and the oil-cooled region in the pulse inverter in the region of the busbars is omitted and a simple design is permitted.

It is also advantageous if the busbars are designed with a supply channel for the oil so that oil is able to flow along the busbars along the respective supply channel. As a result, the oil can flow along the busbars and effectively cool the busbars along the extent of the supply channel.

It is also expedient if a pump is provided to convey the oil along the respective supply channel of the busbars from the pulse inverter to the electric machine or vice versa. An effective cooling circuit can thus be provided.

It is also expedient if a plurality of busbars are provided, in particular at least three busbars. For example, a three-phase machine can thus be operated and supplied effectively.

It is particularly preferable if the electric machine has a first housing, the pulse inverter has a second housing and the busbars are arranged in a third housing in a manner running between the electric machine and the pulse inverter. A secure and separate arrangement can thus be provided, with any interfaces between the housings being designed in such a way that the oil supply is ensured, for example by way of through-flow openings or channels.

It is thus also advantageous if the busbars are arranged in the third housing so as to have oil flow through and/or around them. Effective cooling of the busbars is thus permitted.

Figure 1:
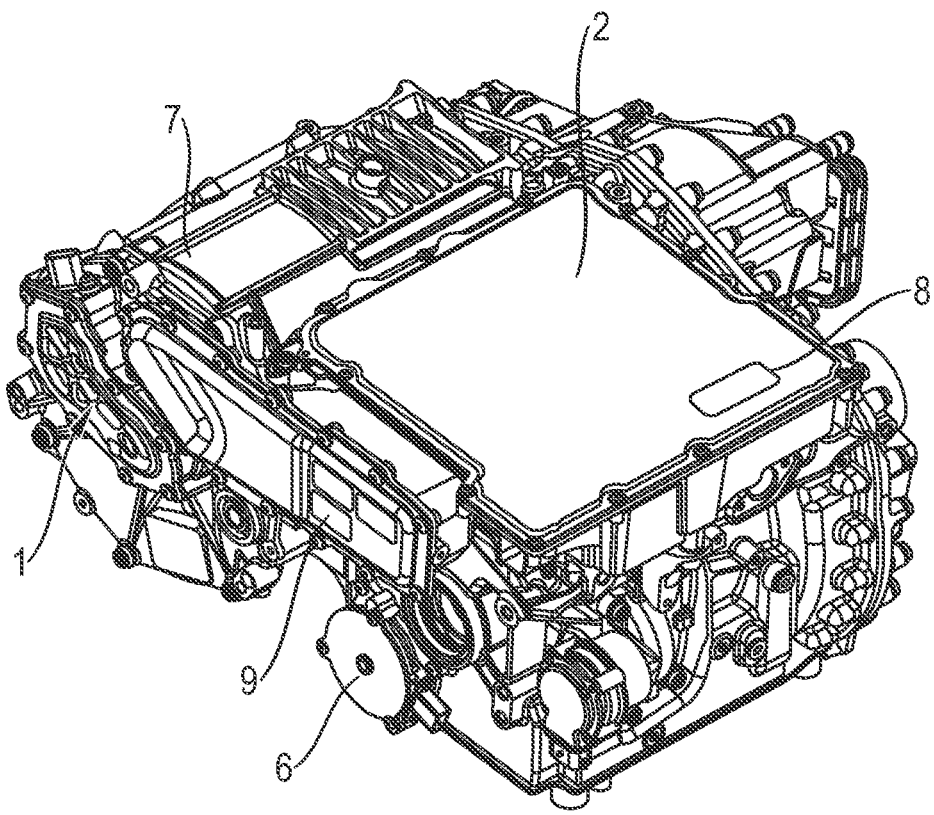
FIG. 1 shows a schematic illustration of an inventive arrangement of an electric machine comprising a pulse inverter.

FIG. 1 shows an arrangement of an electric machine 1 comprising a pulse inverter 2 for supplying electrical energy to the electric machine 1.

Figure 2:
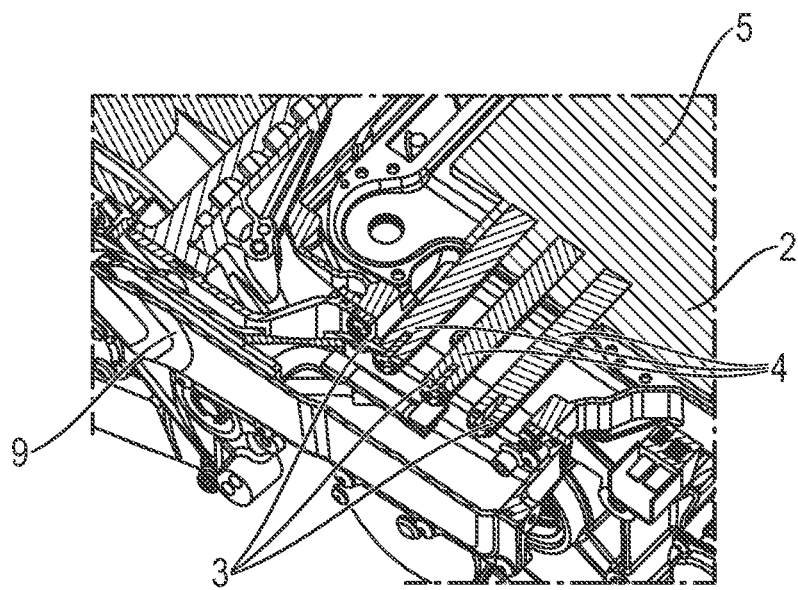
FIG. 2 shows a schematic illustration of a detail of the connection of the busbars at the pulse inverter.

FIG. 2 shows a detail of an electrical connection between the electric machine 1 and the pulse inverter 2 by means of busbars 3.

The busbars 3 are electrically connected to the electric machine 1 on the side of the electric machine 1. To this end, the electric machine 1 has corresponding connection points to which the busbars 3 are connected.

Furthermore, the busbars 3 are electrically connected on the other side to a connection element 4 of the pulse inverter 2.

In this case, the busbars 3 and the electric machine 1 are operated in a manner cooled by oil. In order to achieve improved cooling and in order to prevent the sealing between the busbars 3 and the pulse inverter 2, the pulse inverter 2 has an oil space 5 which is filled with oil and through which oil flows in order to supply and cool the busbars 3, such that the busbars 3 can be supplied with oil within the oil space 5 in the region of the pulse inverter 2.

It is particularly preferable if the busbars 3 are designed with a supply channel for the oil so that oil is able to flow along the busbars 3 along the respective supply channel. This results in improved cooling.

Furthermore, a pump 6 is provided to convey the oil along the respective supply channel of the busbars 3 from the pulse inverter 2 to the electric machine 1 or vice versa.

In FIG. 2, it can be seen that a plurality of busbars 3 is provided. In the specific exemplary embodiment, three busbars 3 are shown.

Furthermore, it can be seen that the electric machine 1 has a first housing 7, the pulse inverter 2 has a second housing 8 and the busbars 3 are arranged in a third housing 9 in a manner running between the electric machine 1 and the pulse inverter 2. In this case, each of the housings 7, 8, 9 can be opened and closed again in a sealed manner as required in order to carry out maintenance work etc. as necessary.

It is optionally particularly expedient for the cooling if the busbars 3 are arranged in the third housing 9 so as to have oil flow through and/or around them.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS

1 Electric machine
2 Pulse inverter
3 Busbar
4 Connection element
5 Oil space
6 Pump
7 First housing
8 Second housing
9 Third housing

The invention claimed is:

1. An arrangement comprising:
an electric machine having a first housing:
a pulse inverter having a region with an oil space and having a second housing; and
busbars,
wherein the electric machine is electrically connected to the pulse inverter by the busbars such that the busbars are electrically connected to a connection of the pulse inverter,
wherein the busbars, the pulse inverter, and the electric machine are cooled by oil,
wherein the oil for supplying and cooling the busbars is stored within the oil space in the region of the pulse inverter,
wherein a portion of the busbars is arranged in a third housing, and
wherein the third housing runs between the electric machine and the pulse inverter, and the first housing, the second housing, and the third housing are in fluid communication with each other.

2. The arrangement as claimed in claim 1, wherein the busbars are each configured with a supply channel for the oil so that oil is able to flow along the busbars along the respective supply channel.

3. The arrangement as claimed in claim 2, wherein a pump is provided to convey the oil along the respective supply channel of the busbars from the pulse inverter to the electric machine or vice versa.

4. The arrangement as claimed in claim 3, wherein the busbars are arranged in the third housing so as to have oil flow through and/or around the busbars.

5. The arrangement as claimed in claim 1, wherein at least three busbars are provided.

6. The arrangement as claimed in claim 1, wherein the first housing, the second housing, and the third housing are further configured with a first interface between at least the first housing and the third housing as well as a second interface between at least the second housing and the third housing, wherein the first interface is configured without any seal between the first housing and the third housing and wherein the second interface is configured without any seal between the second housing and the third housing.

7. The arrangement as claimed in claim 1, wherein the first housing, the second housing, and the third housing are further configured with a first interface between at least the first housing and the third housing as well as a second interface between at least the second housing and the third housing, wherein each of the interfaces has an open state and a closed state, wherein the open state permits the fluid communication across the interface, and wherein the closed state breaks fluid communication across the interface.

8. The arrangement as claimed in claim 1, wherein the third housing runs between the first housing and the second housing.

9. The arrangement as claimed in claim 1, wherein the oil space is in the second housing, and a second portion of the busbars are arranged in the oil space.

* * * * *